United States Patent [19]

Butterfield

[11] Patent Number: 4,480,173
[45] Date of Patent: Oct. 30, 1984

[54] WATER HEATER

[75] Inventor: Brian J. Butterfield, Delgany, Northern Ireland

[73] Assignee: Metal Spinners (Ireland) Limited, Newtownmountkennedy, Northern Ireland

[21] Appl. No.: 275,736

[22] Filed: Jun. 22, 1981

[30] Foreign Application Priority Data

Jun. 23, 1980 [GB] United Kingdom ............... 8020539

[51] Int. Cl.$^3$ ...... A47J 31/56; F24H 1/20
[52] U.S. Cl. ............. 219/312; 219/328; 219/333; 122/4 A; 137/341; 99/281; 99/294
[58] Field of Search ............ 122/4 A, 13 A, 233, 122/234; 126/361; 137/334, 341, 587; 219/312, 310, 316, 319, 322, 323, 327, 328, 332, 333, 281, 440, 297, 314; 99/280, 281, 288, 282, 283, 284, 291, 294

[56] References Cited

U.S. PATENT DOCUMENTS

| 2,152,410 | 3/1939 | Illy | 99/291 |
|---|---|---|---|
| 2,335,250 | 11/1943 | Adlam | 137/334 |
| 2,488,817 | 11/1949 | Kaminky | 99/291 |
| 2,616,023 | 10/1952 | Meyer | 219/312 |
| 3,025,381 | 3/1962 | Pickering | 219/319 |
| 3,031,947 | 5/1962 | Heuckeroth | 99/294 |
| 3,103,575 | 9/1963 | Pecci | 219/333 |
| 3,422,248 | 1/1969 | Beaulieu | 219/281 |
| 3,610,279 | 10/1971 | McIntosh | 137/334 |
| 3,964,466 | 3/1975 | Ohringer | 126/361 |
| 4,137,833 | 2/1979 | Yelloz | 99/293 |
| 4,165,732 | 8/1979 | Morin | 219/314 |
| 4,204,465 | 5/1980 | Knecht | 99/293 |
| 4,242,568 | 12/1980 | Wunderlin | 219/296 |
| 4,287,817 | 9/1981 | Moskowitz | 219/296 |

FOREIGN PATENT DOCUMENTS

| 2434336 | 1/1976 | Fed. Rep. of Germany | 99/280 |
|---|---|---|---|
| 366256 | 2/1932 | United Kingdom | 219/297 |

Primary Examiner—C. L. Albritton
Assistant Examiner—Teresa J. Walberg
Attorney, Agent, or Firm—Hubbard, Thurman, Turner & Tucker

[57] ABSTRACT

A water heater capable of generating water at any temperature from ambient mains temperature to boiling and also for generating steam on demand includes a closed water tank having a water inlet with a valve for allowing or preventing ingress of water into the tank, a non-return valve for preventing water from the tank flowing back into the main supply and a pressure reducing valve for ensuring that the water pressure in the water inlet pipe and in the tank does not exceed a preset value, a water level transducer for detecting the water level in the tank, a heater for heating the water in the tank, a temperature sensor for detecting the temperature of water in the tank, a hot water outlet arranged towards the bottom of the tank, preferably a mixing valve in the hot water outlet mixing hot water leaving the tank with water at ambient mains temperature, a steam outlet arranged towards the top of the tank, and a controller receiving signals from the water level detector, the temperature detector and a programmer device, to control the pressure of water in the tank, the temperature of water in the tank and the water inlet valve.

5 Claims, 1 Drawing Figure

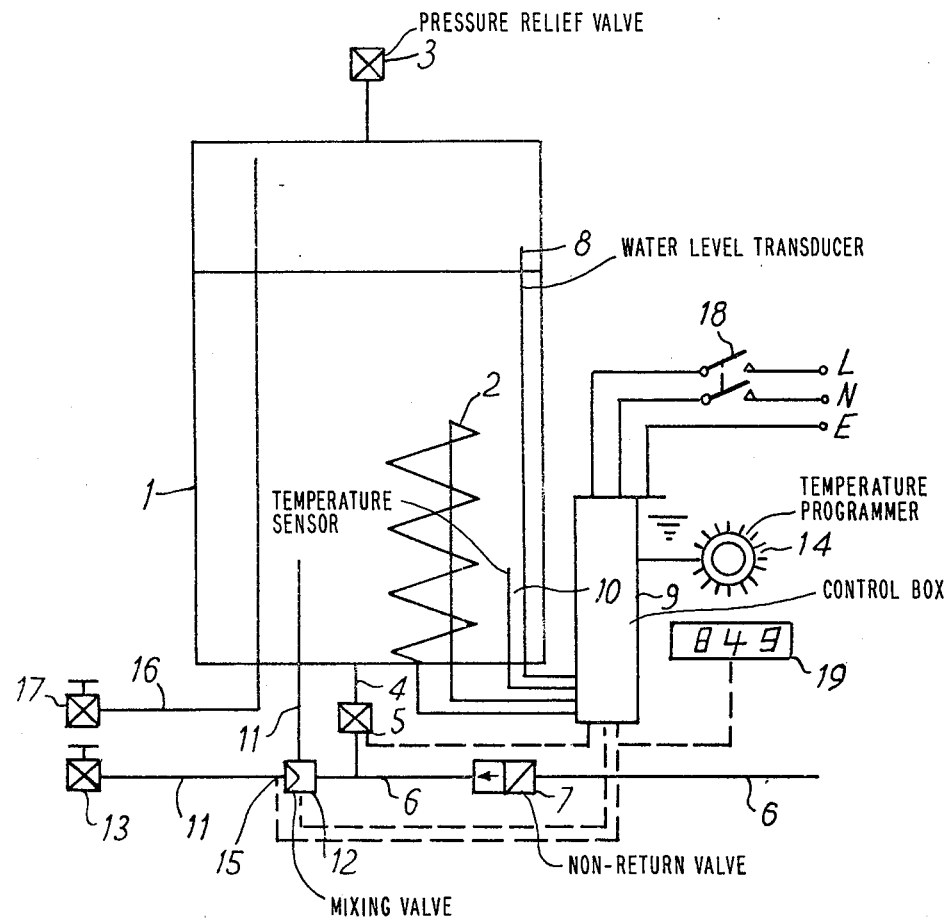

WATER HEATER

This invention relates to water heaters and especially to a water heater capable of generating water at any temperature from ambient mains temperature to boiling and also for generating steam on demand.

Although boiling water/steam generator units have been available for some time for commercial operations for example in cafes and restaurants no unit of this type has yet been produced for domestic use.

The device according to the invention is a water heater unit for domestic use which will provide instantaneously either a volume of water, most usually between 1 and 5 liters at a temperature between the mains supply temperature and 100° C., or steam at approximately 120°–130° C., continuously. In addition to providing for a supply of hot water at any desired temperature by adjusting the mixing ratio of hot water in the heater at 100° C. with cold water from the mains, the device of the invention can also supply boiling water on demand to make tea or coffee or steam which can be used to heat up rapidly from cold a jug of milk or the like, to cook food such as scrambled egg or to supply a pressure cooker direct. The device of the invention also makes the use of steam available for, for example, sterilisation, for which purposes there has never previously been a satisfactory and safe domestic source of supply.

By the use of the device of the invention it is possible to achieve quickly and efficiently operations which at present take considerable time and waste considerable energy. Assuming no heat is lost, a 3 kilowatt kettle, for example, takes approximately two minutes to heat one liter of tap water to 100° C. It has to be filled, plugged in, switched on, switched off, unplugged and carried with its contents to the point of use. A kettle in fact does radiate heat and boiling water can be spilt from it. In contrast, using the device of the invention one liter of boiling water can be obtained in approximately 15 seconds and there is moreover the added facility of obtaining steam.

A further advantage of the device of the invention is that when using a kettle it is frequently necessary to heat a considerably greater volume of water than is required and this involves considerable wastage of energy. Desired quantities of water, however small the volume, can be obtained without heat wastage using the device of the invention. The use of steam for heating cold liquids and for direct cooking avoids the need to switch on a cooker with attendant waste of heat and obviates the risk of burning from a surface which remains hot for some time after the use of the cooker has been terminated. Direct injection of boiling water or steam into a pressure cooker greatly reduces the time necessary to bring the pressure cooker up to the desired cooking pressure and accordingly reduces heat wastage.

The device according to the invention comprises a closed water tank having a water inlet with valve means for allowing or preventing ingress of water into the tank, a non-return valve for preventing water from the tank flowing back into the main supply and a pressure reducing valve for ensuring that the water pressure in the water inlet pipe and in the tank does not exceed a pre-set value, means for detecting the water level in the tank, means for heating the water in the tank, means for detecting the temperature of water in the tank, hot water outlet means arranged towards the bottom of the tank, preferably a mixing valve in the hot water outlet for mixing hot water leaving the tank with water at ambient mains temperature, steam outlet means arranged towards the top of the tank, and control means receiving signals from the water level detecting means, the temperature detecting means and a programmer device, to control the pressure of water in the tank, the temperature of water in the tank and the water inlet valve means.

Preferably the pressure reduction valve is so arranged that the maximum pressure in the tank is of the order of 2 bar absolute. This allows a water temperature of approximately 120° C. to be reached. When the tank contains water at this temperature opening the steam outlet means ensures that water from the boiler flashes to steam with consequent drop of level within the tank. This actuates the water inlet valve which opens to maintain the level. At the same time the heater is switched on so that the pressure temperature equilibrium is maintained.

Should boiling water be required addition of mains water through a mixing valve in the hot water outlet to water that would otherwise immediately flash to steam will ensure that water at 100° C. can be obtained. Water at temperatures below boiling can be obtained by altering the degree of mixing of hot water, which is possibly above 100° C., with mains water through the mixing valve.

Should it not be required to have either steam or boiling water at any particular time the device of the invention can be arranged so that the pressure in the tank is substantially atmospheric and the temperature is at any desired temperature between ambient mains temperature and 100° C.

The energy related variables in the device are temperature and pressure but since in the steam producing mode the tank contains steam and water in equilibrium the temperature and pressure are in a fixed relation so that by controlling one the other is also controlled. For reasons of simplicity, reliability, low need for maintenance and cost, the heater element is preferably controlled from a temperature transducer, for example, a temperature variable resistance. Such a variable resistance can easily be integrated in an electronic control system. As the temperature transducer will normally be cycling during the normal mode of operation, it can not be relied on as the ultimate protection against burn out and preferably a fusible circuit breaker is present in the transducer circuit.

The water level is preferably sensed by a level transducer, the main function of which is to control the water inlet valve so that it opens when the water level falls below a desired level and closes when the water level reaches a desired pre-set level, which is below the level of the steam outlet. The level transducer preferably also causes the heater element to switch off should the water level fall to a dangerously low level or if the water level rises too high, to avoid superheated water passing through the steam outlet.

Preferably a dielectric water level transducer is used. This has the advantage that there are no moving parts in the water space and the accuracy is unlikely to be significantly affected by scale. Furthermore, in sensing the various levels at which different functions are effected the output from the transducer can be integrated easily into an electronic control circuit, for example using tuned circuits.

Another control component preferably present for the safe working of the device is a combined non-return and pressure reduction valve in the inlet water supply. This is a passive mechanical device which does not interact with any other components. Also desirable, despite other safety devices, is a pressure relief valve which for simplicity and reliability can be of the weight operated type currently used on pressure cookers.

In addition to controls desirable to ensure safe running, other controls are needed to operate the boiler. The minimum controls required are an ON/OFF switch, hot water and steam outlet control taps and a mixing valve to control the hot water draw off temperature. Preferably, the mixing valve is remote controlled so that the user can dial the required temperature. A motorised mixing valve may be controlled from an electronic control box using a temperature sensor in the outlet pipe to provide a temperature error feedback to the control box. This then signals a corresponding correction to the mixing valve. This ensures that the temperature of water received matches the temperature demanded.

Although the means for heating the water in the tank is preferably an electric immersion heater it is possible for the water to be heated by other means, for example, gas or oil with suitable thermostatic control for the burners.

BRIEF DESCRIPTION OF THE DRAWING

The drawing is a schematic diagram of one form of device in accordance with the invention.

DESCRIPTION OF THE PREFERRED EMBODIMENT

The device comprises a closed water tank 1 provided with an electric immersion heater 2 in its lower section and a pressure relief valve 3 in the form of a weighted pin of the type conventionally used on domestic pressure cookers.

A water inlet 4 controlled by a motorised valve 5 feeds from a mains connection 6 into the bottom of the tank 1. A pressure reduction and non-return valve 7 is located in the mains line 6 upstream of the water inlet 4. Within the tank 1 a water level transducer 8 controls inlet valve 5 to close the valve 5 when the level of water in tank 1 reaches a predetermined level at which the tank 1 is not full and opens the valve 5 when the water level in the tank falls below a second predetermined level. The water level transducer 8 also provides a signal to switch off heater 2 should valve 5 fail to open and the water level drop to a dangerously lower level. The signals provided by the level transducer 8 are processed in an electronic control box 9 which also receives signals from a temperature sensor 10 and signals from other sources to be described hereinafter.

Two outlets from the tank 1 are provided. The first outlet 11 draws off hot water from a point towards the bottom of the tank 1, outlet 11 joining mains pipe 6 at a point downstream of its junction with inlet 4, via a motorised mixing valve 12. Outlet 11 is closed by a tap 13. Motorised mixing valve 12 is controlled from the electronic control box 9 via a temperature programmer 14 which is set to the desired water draw-off temperature such that the mixing ratio of mains water from pipe 6 and boiling water from tank 1 is adjusted to achieve the desired temperature. Downstream of mixing valve 12 the temperature of the mixed water is monitored by a temperature sensor at 15. The second outlet from the tank 1 is a steam outlet 16 closed by a tap 17. The steam outlet 16 draws in steam from a point near the top of the tank and well above the maximum designed water level in tank 1 as determined by the sensor 8.

The device is connected to the electrical mains via a simple ON/OFF switch 18.

As is also shown in the drawings there may be provided a temperature read-out device 19 which constantly prints out the temperature monitored by the temperature sensor at point 15.

I claim:

1. A water heater device for providing steam and hot water selectively for domestic uses such as cooking or beverage making comprising a closed water tank having a water inlet with valve means for selectively allowing and preventing ingress of water into the tank, a non-return valve for preventing water from the tank flowing back into the main supply and a pressure-reducing valve in line with said water inlet for ensuring that the water pressure in the water inlet and in the tank does not exceed a preset value, means for detecting the water level in the tank and for providing a signal indicative thereof, means for heating the water in the tank, means for detecting the temperature of water in tank and for providing a signal indicative thereof, hot water outlet means arranged towards the bottom of the tank, a hot water tap connected to a discharge end of said hot water outlet means whereat hot water is discharged at the option of the user, steam outlet means arranged to collect steam from adjacent the top of the tank, a steam tap connected to a discharge end of said steam outlet means whereat steam is discharged at the option of the user, and control means for controlling the pressure of water in the tank, the temperature of water in the tank and the water inlet valve means, said control means receiving signals from the water level detecting means, the temperature detecting means and from a programmer device for storing a desired water temperature and providing a signal indicative of that desired temperature.

2. A water heater as claimed in claim 1 wherein the hot water outlet means includes a mixing valve for mixing hot water leaving the tank with water at ambient mains temperature.

3. A water heater is claimed in claim 1 wherein the pressure reduction valve is arranged such that the maximum pressure in the tank is of the order of 2 bar absolute.

4. A water heater as claimed in claim 1 wherein the heater means is controlled from a temperature transducer.

5. A water heater as claimed in claim 1 wherein the water level is sensed by a level transducer.

* * * * *